United States Patent [19]
Hobbs et al.

[11] Patent Number: 5,794,023
[45] Date of Patent: Aug. 11, 1998

[54] APPARATUS UTILIZING A VARIABLY DIFFRACTIVE RADIATION ELEMENT

[75] Inventors: Philip Charles Danby Hobbs, Briarcliff Manor; Theodore Gerard van Kessel, Millbrook, both of N.Y.

[73] Assignee: International Business Machines Corporation, Armonk, N.Y.

[21] Appl. No.: 656,627

[22] Filed: May 31, 1996

[51] Int. Cl.[6] .................................................. G02B 5/18
[52] U.S. Cl. ........................ 359/565; 359/573; 359/576
[58] Field of Search .............................. 359/565, 573, 359/576, 19

[56] References Cited

U.S. PATENT DOCUMENTS 5,066,126  11/1991  Hatori ................................. 385/1

FOREIGN PATENT DOCUMENTS 357119329A  7/1982  Japan ................................. 385/10

Primary Examiner—Jon W. Henry
Attorney, Agent, or Firm—Scully, Scott Murphy and Presser

[57] ABSTRACT

Apparatus suitable for transforming a radiation beam so that it can exit with a predetermined alteration. The apparatus includes a first variably diffractive radiation element for transforming a characteristic of the radiation beam from an original state; a second radiation element juxtaposed to the first radiation element for transforming the same characteristic in a complementary way; and, means for physically deforming the first variably diffractive radiation element so that its diffracting pattern can change in a known way.

29 Claims, 5 Drawing Sheets

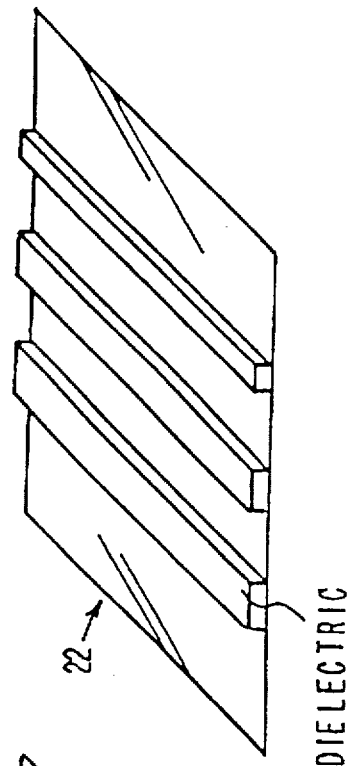
FIG. 2a LINEAR AMPLITUDE
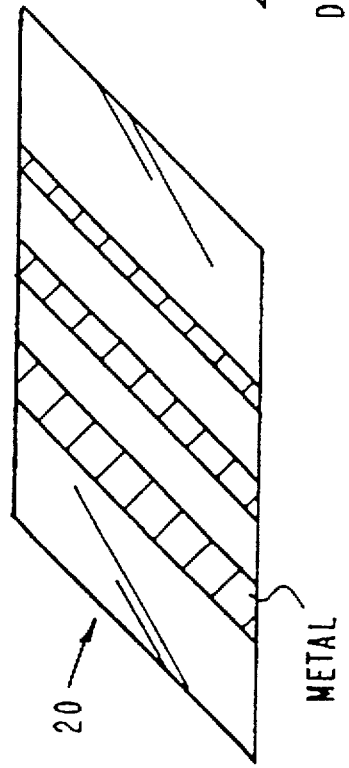
FIG. 2b LINEAR PHASE
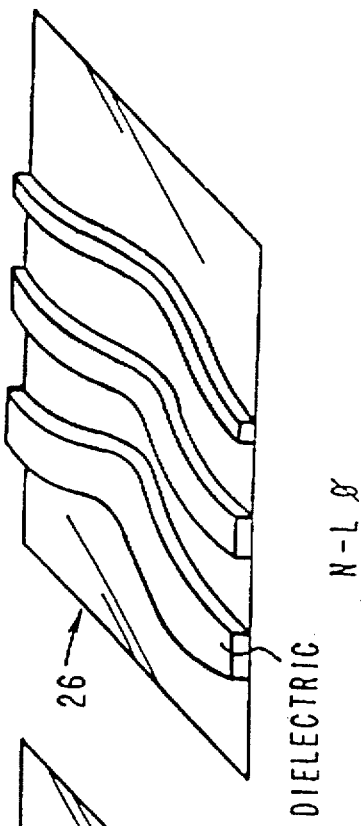
FIG. 2c N-L
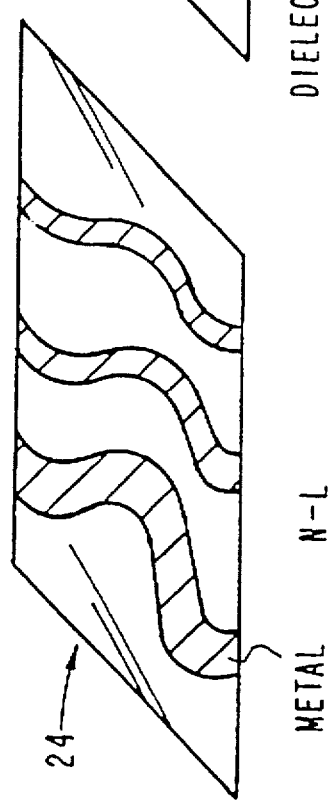
FIG. 2d N-L ∅

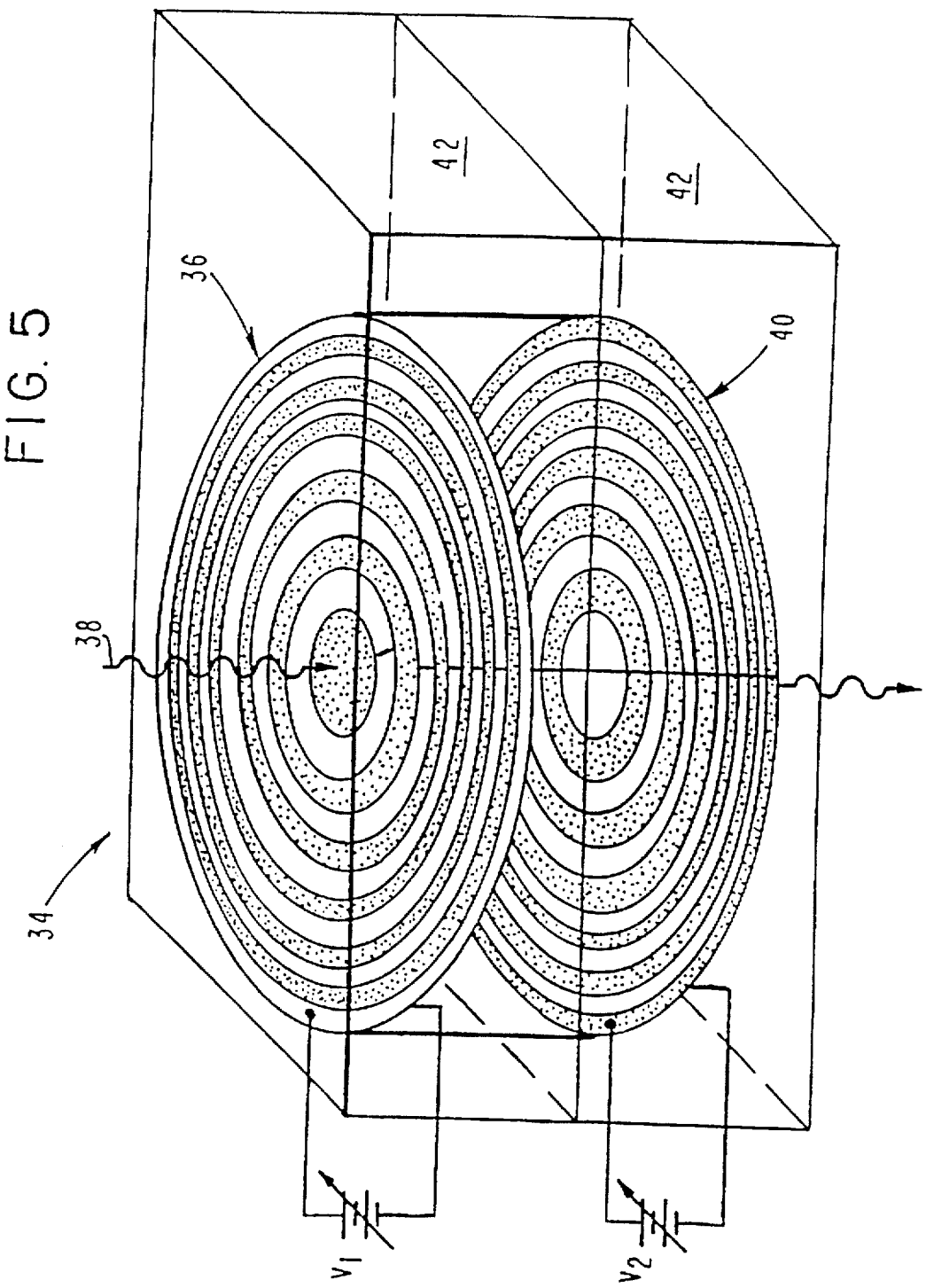

APPARATUS UTILIZING A VARIABLY DIFFRACTIVE RADIATION ELEMENT

FIELD OF THE INVENTION

This invention relates to apparatus suitable for transforming a radiation beam so that the radiation beam can exit the apparatus with a predetermined alteration.

INTRODUCTION TO THE INVENTION

Our motivation and methodology for the present invention are informed by an illustrative situation which centers on scanning optical radiation systems used in hand-held document scanners, or consumer CD players, or magneto-optic storage devices.

SUMMARY OF THE INVENTION

A desired scanning system performance is one that preferably is substantially free of deleterious optical aberrations, like tilt or defocus. To this end, the focus of a scanning radiation beam preferably is controllable with respect to location, notwithstanding mechanical or thermal shocks to the system, or mild warpage of a recording media, or, with respect to the hand-held document scanner, required changes in the state of focus of the radiation beam within each line scan.

Our methodology is to accommodate the sundry focal changes or perturbations, by quickly and sensitively producing counter-balancing focal shifts.

As prelude to defining a novel apparatus which can effect such focal shifts, we first set in apposition and critique some prior art approaches pertinent to our situation: this effort can highlight the uniqueness and the advantages of the present invention.

Typical scanning optical systems using focused beams usually require some sort of autofocus subsystem to make sure that the focus of the radiation beam is in the desired location. These systems may employ a moving lens technology and operate by translating a small lens on a voice coil or other linear actuator. These systems, however, may be severely limited in their control bandwidth by inertial, magnetic, and power consumption constraints. Their bandwidths typically do not exceed 100 Hz. Thus, while adequate to track warped or misaligned CDs, a 100 Hz bandwith is insufficient to damp out the effects of mechanical shock, so that portable CD and optical disk readers may be vulnerable to glitches from even slight mechanical perturbations. In a document scanner application, if the line scan rate is 2–5KHz (corresponding to scanning an 8.5×11 inch page in 0.5 to 1.25 seconds at 300 dots per inch), a focus actuator must produce a focus shift of approximately 1 diopter, and be able to reproduce at least the first and possibly the third harmonic of the line rate. The focus actuator must therefore respond at 2 to 15 kHz, which is unreasonably difficult with a moving-lens technology.

We note, moreover, that advances in control bandwidth are difficult to achieve. Consider: the bandwidth is limited by the lowest resonant frequency of the actuator assembly, which is given by $$\omega_0 = \frac{\sqrt{K}}{\sqrt{M}} \tag{1}$$

The spring constant (K) may come from a physical spring, or be synthesized by the combination of a position encoder and a feedback loop controlling a magnetic actuator. To improve the bandwidth of a 100 Hz moving-lens system to 5 kHz, accordingly, impractically requires a factor of $(5000/100)^2 = 2500$ increase in actuator force, even without allowing for the inevitable increase in actuator inertia.

The main competitors to the mechanical moving-lens focus actuator are the electrooptic and real time holographic (photorefractive) lenses, and the liquid crystal spatial light modulator (SLM).

An electrooptic lens can be made from materials such as potassium dihydrogen phosphate (KDP), lithium niobate ($LiNbO_3$), or a ferroelectric polymer such as polyvinylidene fluoropolmer (PVDF). Although it is very fast (1–10 ns), the electro-optic effect is extremely weak, typically requiring hundred (PVDF) to thousands (KDP, $LiNBO_3$) of volts for a phase delay of one half wave. Since a lens of 5 mm diameter with a 1m focal length (1 diopter) exhibits a centre-to-edge phase delay of 10 waves, a change of this magnitude cannot be achieved electro-optically.

A real-time holographic lens can be made by taking a photorefractive material (whose refractive index can be made to change reversibly by optical irradiation) and projecting an interference pattern formed by two beams in different states of focus. The hologram thus recorded in the photorefractive material functions as a Fresnel zone plate (rather like a lens), focusing another laser beam to the desired position. The speed of these devices is nearly unlimited (1 ns has been achieved), but unfortunately, generating the two writing beams themselves requires an extremely fast focus actuator, so this is not a solution.

A liquid crystal spatial light modulator can also synthesize an approximation to a Fresnel zone plate, but the achievement of fine-grained control of the focal length requires an unreasonably large number of segments, which must be updated at megahertz rates.

As alluded to above, we have discovered a novel apparatus that addresses and solves, in particular, the problem of controlling focal location in scanning optical systems. More generally, the novel apparatus subsumes controlled changes of a radiation beam in such a way so as to selectively cause inter alia diffracting, beam aberation, compensation, variable retardation, apodization, or focusing, to advantageously realize an enhanced capability compared to the prior art.

The novel apparatus is suitable for transforming a radiation beam, and comprises:

1) a first variably diffractive radiation element for transforming a characteristic of the radiation beam from an original state;

2) a second radiation element juxtaposed to the first radiation element for transforming the same characteristic in a complementary way; and 3) means for physically deforming the first variable diffractive radiation element so that its diffracting pattern can change in a known way;

whereby, a radiation beam can exit the apparatus with a predetermined alteration.

DETAILED DESCRIPTION OF THE DRAWING

The invention is illustrated in the accompanying drawing, in which:

FIG. 1 shows an apparatus useful for explaining an element of the present invention;

FIGS. 2a–d show alternative embodiments of the present invention;

FIG. 5 shows a further embodiment of the present invention.

DETAILED DESCRIPTION OF THE INVENTION

The apparatus of the present invention is defined above, and the detailed description proceeds by unfolding in stages its various degrees of specificity and preferred embodiments, as these reference particular elements of the apparatus, its construction, and its overall operation and use.

The first variably diffractive radiation element (first element) transforms a characteristic of an incident radiation beam from an original state. For example, the first element can transform the phase, the amplitude, or the phase and the amplitude of the incident beam (which is typically in the optical portion of the electromagnetic spectrum). To this end, the first element preferably comprises a piezoelectric material, for example, a piezoelectric film.

Figure 1:
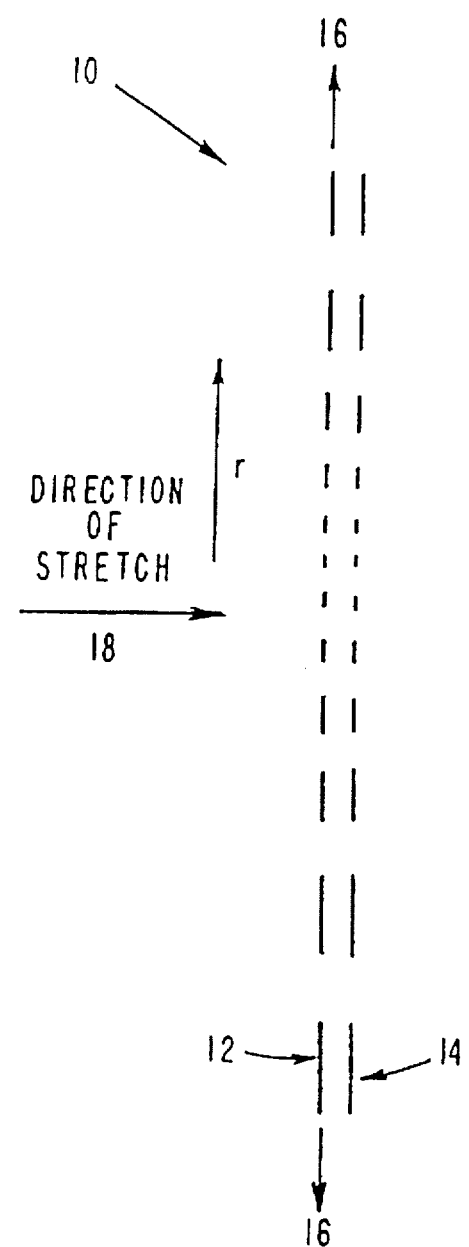

The second radiation element is juxtaposed to the first element for transforming the same characteristic i.e., phase and/or amplitude in a complementary way, and may comprise a lens, or a mirror, or a diffraction grating. By juxtaposed, we mean, for example, a spaced-apart geometric configuration, including first and second spheres or cylinders, one enclosed within the other, or first and second parallel planes. By "transforming in a complimentary way", we mean that the second radiation element can modify the action of the first variably diffractive radiation element so that the variation in the action of the first element produces a relatively much larger change in the action of the entire apparatus. An example of this point is provided by way of an apparatus 10, shown in FIG. 1. The FIG. 1 apparatus 10 comprises an apodization pattern comprising first and second amplitude masks (12, 14), in which the mask 12 may be radially stretched (arrows 16) to block an incident radiation beam 18.

The apparatus also includes means for physically deforming the first variably diffractive radiation element so that its diffraction pattern can change in a known way. This diffracting pattern may comprise a patterned dielectric or a patterned opaque material. The diffracting pattern may comprise a Fresnel phase zone plate or a Fresnel amplitude zone plate. FIGS. 2a–2d, numerals 20–26 illustrate that the diffracting pattern may comprise a linear amplitude or phase grating or a non-linear amplitude or phase grating, respectively.

The apparatus may comprise mechanical deformation means for physically deforming the first variably diffractive radiation element, for example, mechanical stretching means. Preferably, the apparatus comprises piezoelectric means for physically deforming the first element. Specific means for stretching of film (membrane) include: direct piezoelectric control of a membrane; lamination of a membrane to a piezoelectric element with a hole in it; mounting a membrane on a piezoelectric ring; using a slip ring/mandrel combination; using a flexure mount to mechanically stretch a film; inflating a membrane, using air, vacuum , or some fluid; or, a thermal expansion or contraction of a membrane or of its mount.

In a preferred embodiment, the second radiation element is diffractive and forms a moire pattern in juxtaposition with the first diffractive radiation element. For example, the first and second radiation elements may each comprise a Fresnel zone plate, having focal lengths respectively of $f_1$, $f_2$, so that the first and second radiation elements act in combination to form a moire pattern whose focal length is approximately $$f = \frac{|f_1 - f_2|}{(f_1 f_2)}.$$

Alternatively, the second radiation element is diffractive and in juxtaposition with the first diffractive radiation element can act approximately as a focus actuator, or a lens, or a curved mirror.

Figure 3:
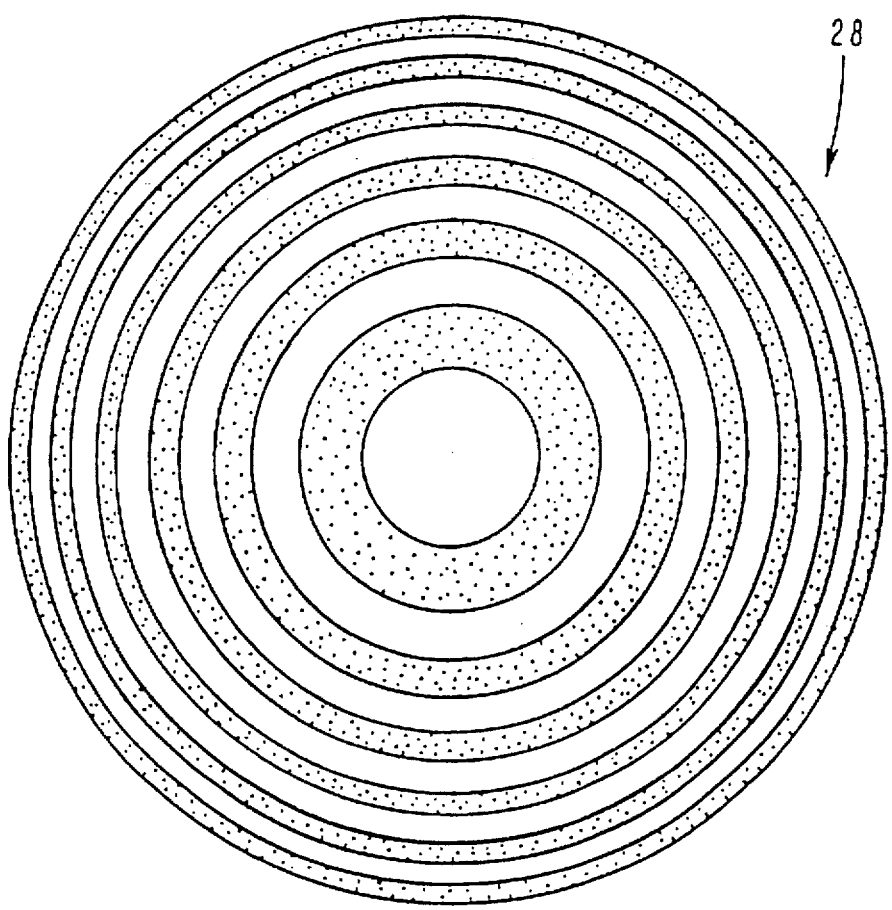
FIG. 3 shows a variable zone plate for use as a lens.

Attention is now directed to FIG. 3 which shows a single variable zone plate 28 that may be used as a lens. Here, a film of piezoelectric polymer may be coated with a patterned dielectric such as photoresist. The pattern is that of a Fresnel phase zone plate, i.e., a set of nested rings, whose optical thickness is alternately 0 (no coating) and $\lambda/2$ and whose radii increase as the square root of integers. If the centre of the pattern is bare (thickness 0), the inner radii of the resist rings is given by $$R = \sqrt{(2i + 1/2)f\lambda} \tag{2}$$

and their outer radii by $$R_{0i} = \sqrt{(2i + 3/2)f\lambda}, \tag{3}$$

where $f$ is the focal length of the zone plate, $\lambda$ is the wavelength of the light, and i is (0,1, . . . N) for some N which determines the edge of the clear aperture of the zone plate.

The Fresnel zone plate is an example of a much larger class of pattern structures, whose effect is to change the amplitude and/or the phase of the radiation passing through them, in such a way as to cause focusing, diffraction, beam aberration, apodization, and so forth.

Since the film substrate is piezoelectric, putting a voltage across the substrate causes it to expand or contract, which in turn changes the radii of the zones, and hence the focal length of the zone plate. Piezoelectric polymers exhibit a maximum elongation of about 1 part in $10^3$, so that from Eq. 3 the focal length changes by approximately $2\times10^{-3}$. This means that a nominal 10 mm focal length becomes 9.98 mm or 10.02 mm, a difference which is too small to be useful for most purposes.

A second problem with this simple scheme is that the expansion of piezoelectric polymer is highly anisotropic, with most of the expansion occurring along the direction in which the film was stretched during manufacture. This leads the zone plate to become astigmatic, since the phase rings become elliptical.

Figure 4:
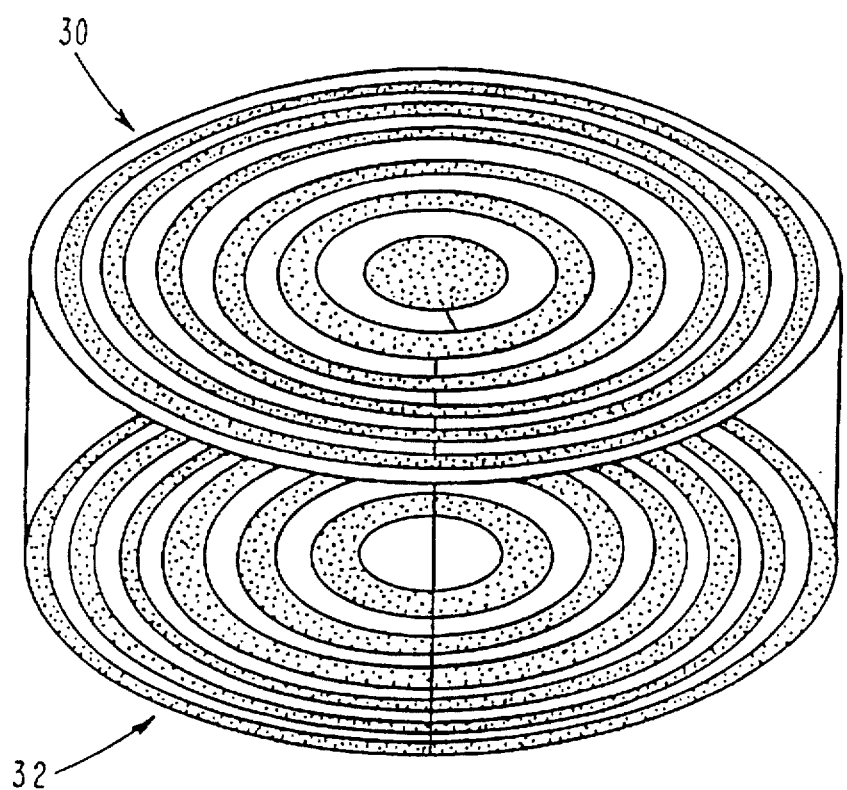
FIG. 4 shows two zone plates which can form a moire pattern.

The small change in focal length can be solved by exploiting the moire effect as shown in FIG. 4. Two identical phase zone plates 30, 32 of focal length $f_1$, close to each other and aligned, are equivalent to a single zone plate, whose zones differ by one optical cycle of phase. Apart from edge effects, such a plate has no effect on the state of focus of the beam; it thus has effectively infinite focal length. Alternatively, if the resist pattern on one zone plate is the negative of that on the other, the two patterns cancel without large discontinuities in phase.

If one of the zone plates is slightly coarser in pitch than the other, so that its focal length is $f_2$, the rings become phased slightly differently; the linear dependence of the ring frequency on radius means that the moire pattern is also a zone plate, whose focal length is $$f = \frac{|f_1 - f_2|}{f_1 f_2} \quad (4)$$

If one of the zone plates is made from piezoelectric film, so that $f_1=10.00$ mm (say) and $f_2$ can be varied from 10.00 to 10.02 mm, $f=5100$ mm, a change in power of 0.2 diopters. Shorter focal length zone plates produce correspondingly larger changes in power. If the focal lengths are initially 2 mm, the same 1 part in $10^3$ strain gives $f=1002$ mm, a 1 diopter change, which is enough for the focus actuator application. (The absolute value sign in Eq. 4 recognizes that a zone plate of focal length f cannot be distinguished from one of focal length -f; unlike lenses, zone plates produce both real and virtual images at the same time.)

The major speed limitation to this device is large-scale mechanical resonance in the membranes. The lowest frequency resonances are the "drum head" modes, in which the membrane vibrates up and down out of the plane. These can be damped very effectively, and the usable frequency response of the actuator dramatically improved, by immersing the device in a suitable fluid, such as water, oil, or a gel.

Out of plane motions of the membrane then couple to sound waves in the fluid, and with adequate attention to choice of acoustic impedance of the fluid, the coupling can be made very strong, so that the resonances are strongly suppressed. On the other hand, in-plane motions of the membrane do not excite sound waves, since they couple only to shear-wave modes which do not exist in fluids, and so these motions are not damped as strongly. In a properly designed device, it might be possible to get usable response up to the first in-plane resonance, which is set by the speed of sound in the membrane divided by its diameter, and thus in the hundreds of kilohertz for a 1 cm diameter membrane. Such a device is limited more by the drive power required to move the mass that rapidly, which depends on the cube of the drive frequency.

The fluid could also be chosen to be a good refractive index match to the film, the photoresist, or to be a compromise between them in order to reduce the overall reflection losses at the surface. The thickness of the resist film has to be adjusted accordingly so that the zone plate still has the desired phase delay properties.

Attention is now directed to FIG. 5 which shows an apparatus 34 that can illustrate these points.

The apparatus 34 comprises a first variably diffractive radiation element 36 comprising a Fresnel phase zone plate comprising a piezoelectric film, for transforming the phase of an incident radiation beam 38 from an original state.

Spaced apart and juxtaposed from the first element 36 is a second radiation element 40. The second radiation element 40 comprises a diffractive pattern for transforming the phase of the radiation beam 38 in a complementary way, i.e., once the action of the first element 36 has been effected, the second element 40 restores the whole.

The apparatus 34 includes means for physically deforming the first element 36 and the second element 40 by way of driving voltages V1, V2, so that their diffracting patterns can change in a known way, i.e., as referenced above in accordance with equations 2,3.

FIG. 5 shows that the first and second elements 36, 40 have been immersed in a conducting liquid 42 comprising salt water. The two elements 36, 40 naturally separate the liquid into three volumes which avoids short circuits if the volumes are kept distinct. This approach has an additional advantage of strongly damping the drum head of the resonances of the film, allowing operations at higher frequency, perhaps as high as the first in-plane resonance near d/c, where d is the diameter of the unsupported film, and c is the speed of sound in the material. Acoustic losses are manageable since the in-plane motion of the boundary does not excite sound waves in the fluid.

Note that in operation the apparatus 34 can act approximately as a focus actuator and can effect controlled changes of the radiation beam 38 40 that the beam 38 can exit the apparatus 34 in a known way, i.e., quickly and sensitively accommodating sundry focal changes or perturbations to the apparatus 34 so that it controls the focus of the radiation beam 38 with respect to a desired location.

It is not necessary that both membranes consist of phase zone plates. A combination of an amplitude zone plate with a phase zone plate works well too, and it is even possible to use two amplitude zone plates, although the transmittance is poor.

We note that the poor transmittance can be turned to a virtue. If the device has two sets of concentric opaque rings, which at one stretch land on top of each other, and at another are complementary, so that light passed by one set is blocked by the other, the result is a combination of zone plate and shutter. Use of this invention as a shutter can be accomplished in other ways as well, such as two gratings with opaque lines which are moved with respect to one another.

Moire patterns between holograms, at least one of which is mechanically deformable e.g., stretchable, are also contemplated as a generalization of the use of moire patterns between gratings or zone plates.

Specific mechanisms for stretching the films have been disclosed above.

The anisotropy problem alluded to above can be solved by making both zone plates piezoelectric, with their stretch axes mutually perpendicular, and driving them in opposite polarity (i.e., one stretches in X and the other contracts in Y). This produces a moire pattern whose astigmatism can be set to zero by slight changes in the ratio of the driving voltages to the two plates.

The two zone plates can be aligned very accurately during manufacturing by observing the same moire fringes, using known moire alignment techniques.

It is not entirely trivial to apply a voltage to the piezo film, and still have transmitted light. There are three preferred approaches to solving this problem.

1. Do not attempt to stretch the zone plate area itself, but only the surrounding region. This allows the use of better optical plastics for the zone plate region by laminating another sheet to a perforated piezoelectric element.

2. Use a transparent conductive electrode, such as indium tin oxide (ITO) or a conductive polymer such as polyacetylene. This is best placed under the photoresist. It is possible to put ITO films on piezo polymer, but it is less clear how durable the films will be.

3. Immerse the zone plates in a conducting liquid such as salt water, in a manner disclosed above with reference to FIG. 5 and apparatus 34.

Other approaches are possible, such as the use of thin metal lines, but their unavoidable optical artifacts and the requirement of additional lithography steps make them less desirable.

ZONE PLATE FABRICATION

Zone plates can be fabricated on PVDF or similar piezoelectric film by photolithography. For example, a sheet of transparent piezo material may be coated with photoresist of a well controlled thickness, typically equal to $$\frac{\lambda/2}{2(n-n_0)}.$$

where n is the refractive index of the resist, and no is that of the ambient medium (e.g., air or water). The resist is then exposed to light exhibiting the zone plate pattern, e.g., by contact printing using an appropriate mask or by illumination with the interference pattern of two laser beams, and developed to remove the resist from areas which are to be uncoated.

The resulting zone plate element is attached to a ring of somewhat larger diameter than the zone plate, so that the zone plate is not clamped to a constant radius, but can stretch and relax as dictated by the voltage applied to the piezo element. Two such elements can be aligned very accurately by shining a laser beam through them axially, and measuring the diameter and position of the resulting beam using position-sensing detectors such as one or more quadrantic photodiodes. The result is two nearly identical zone plates on piezoelectric material, whose retardations cancel one another (except for phase discontinuities of one whole cycle, which ideally have no effect and which can be eliminated if necessary by using complementary zone plates rather than identical ones).

If the piezo element is not transparent, there are two ways to proceed:

1. Work in reflection, where the piezo element need not be transparent. A reflection zone plate is made the same way as a transmission zone plate, except that it is coated with metal afterwards; alternatively, a mirrored piezoelectric substrate can be coated with resist of half the thickness used in a transmission plate (since the light passes through it twice).

2. Use the piezo element to stretch a zone plate fabricated on a film of adequate optical quality. This alternative allows the use of opaque piezo materials, such as PZT or strontium barium titanate ($SrBaTiO_3$), which may have more isotropic behaviour than PVDF, or even to use another sort of stretching element altogether, such as a piezo-actuated flexure, or even a moving slip ring. In the simplest implementation, a sheet of piezo material has a circular hole cut in it, and a film containing the zone plate is laminated to one side. As the piezo material stretches, the hole diameter stretches proportionally, which forces the film to stretch as well.

We claim:

1. Apparatus for transforming the amplitude and or phase of a radiation beam, the apparatus comprising:
   1) a first variably diffractive radiation element for transforming by diffraction a characteristic comprising the amplitude and/or phase of the radiation beam from an original state;
   2) a second radiation element juxtaposed to the first radiation element for transforming the same characteristic amplitude and/or phase of the radiation beam in a manner complementary to the transformation by the first variably diffractive radiation element to substantially cancel at least one of the transformations of the amplitude and/or phase by the first radiation element; and
   3) means for physically deforming the first variably diffractive radiation element to change its diffracting pattern in a known manner to vary said one of the transformations that is substantially canceled from being fully canceled, whereby a radiation beam exiting the apparatus is subject to a relatively small but highly variable effect due to the combined transformations of said first variably diffractive radiation element and said second radiation element.

2. An apparatus according to claim 1, wherein the first variably diffractive radiation element transforms the phase of the radiation beam.

3. An apparatus according to claim 1, wherein the first variably diffractive radiation element transforms the amplitude of the radiation beam.

4. An apparatus according to claim 1, wherein the first variably diffractive radiation element comprises a piezoelectric material.

5. An apparatus according to claim 4, wherein the piezoelectric material comprises a piezoelectric film.

6. An apparatus according to claim 1, wherein the second radiation element comprises a diffractive pattern.

7. An apparatus according to claim 1, wherein the second radiation element comprises a lens.

8. An apparatus according to claim 1, wherein the second radiation element comprises a mirror.

9. An apparatus according to claim 1, comprising piezoelectric means for physically deforming the first variably diffractive radiation element.

10. An apparatus according to claim 1, comprising mechanical deformation means for physically deforming the first variably diffractive radiation element.

11. An apparatus according to claim 10, comprising mechanical stretching means for physically deforming the first variably diffractive radiation element.

12. An apparatus according to claim 1, wherein the diffracting pattern comprises a patterned dielectric.

13. An apparatus according to claim 1, wherein the diffracting pattern comprises a patterned opaque material.

14. An apparatus according to claim 1, wherein the diffracting pattern comprises a Fresnel phase zone plate.

15. An apparatus according to claim 1, wherein the diffracting pattern comprises a Fresnel amplitude zone plate.

16. An apparatus according to claim 1, wherein the diffracting pattern comprises a linear amplitude grating.

17. An apparatus according to claim 1, wherein the diffracting pattern comprises a linear phase grating.

18. An apparatus according to claim 1, wherein the diffracting pattern comprises a nonlinear amplitude grating.

19. An apparatus according to claim 1, wherein the diffracting pattern comprises a nonlinear phase grating.

20. An apparatus according to claim 1, wherein the second radiation element is diffractive and in juxtaposition with the first variably diffractive radiation element forms a moire pattern.

21. An apparatus according to claim 20, wherein the first and second radiation element each comprise a Fresnel phase zone plate, having focal lengths respectively of $f_1, f_2$ so that the first and second radiation elements act in combination to form a moire pattern whose focal length is approximately $f=|f1-f2|/(f1+f2)$.

22. An apparatus according to claim 1, wherein the second radiation element is in juxtaposition with the first variably diffractive radiation element and acts approximately as a focus actuator.

23. An apparatus according to claim 1, wherein the second radiation element is diffractive and in juxtaposition with the first variably diffractive radiation element acts approximately as a lens.

24. An apparatus according to claim 1, wherein the second radiation element is diffractive and in juxtaposition with the first variably diffractive radiation element acts approximately as a curved mirror.

25. An apparatus according to claim 1, further comprising means for obtaining a predetermined first and second element damping coefficient.

26. An apparatus according to claim 25, comprising means for immersing the the first and second elements in a fluid.

27. An apparatus according to claim 1, wherein the second radiation element is juxtaposed to the first radiation element by being in a geometric configuration of spaced-apart first and second parallel radiation elements.

28. An apparatus according to claim 1, wherein the first and second radiation elements are in close proximity to each other.

29. Apparatus suitable for transforming a radiation beam, the apparatus comprising:

1) a first variably diffractive radiation element comprising a Fresnel phase zone plate comprising a piezoelectric film for transforming the phase of the radiation beam from an original state;

2) a second radiation element comprising a diffractive pattern for transforming the phase of the radiation beam in a complementary way and located in a spaced apart relationship to the first variably diffractive radiation element; and 3) mechanical deformation means for physically deforming the first variably diffractive radiation element so that its diffracting pattern can change in a known way.

* * * * *